(12) United States Patent
Evju

(10) Patent No.: US 6,596,326 B1
(45) Date of Patent: Jul. 22, 2003

(54) GROWTH ENHANCERS

(75) Inventor: Hans Evju, Sarpsborg (NO)

(73) Assignee: Borregaard Industires Limited, Sarpsborg (NO)

( * ) Notice: Subject to any disclaimer, the term of this patent is extended or adjusted under 35 U.S.C. 154(b) by 0 days.

(21) Appl. No.: 09/830,809

(22) PCT Filed: Oct. 12, 1999

(86) PCT No.: PCT/NO99/00309

§ 371 (c)(1),
(2), (4) Date: Jun. 27, 2001

(87) PCT Pub. No.: WO00/27220

PCT Pub. Date: May 18, 2000

(30) Foreign Application Priority Data

Nov. 9, 1998 (NO) ............................................. 19985230

(51) Int. Cl.⁷ .................................................. A23K 3/03
(52) U.S. Cl. ......................... 426/71; 426/335; 426/630; 426/635; 426/807
(58) Field of Search ......................... 426/71, 335, 630, 426/635, 807

(56) References Cited

U.S. PATENT DOCUMENTS 2,905,558 A * 9/1959 Adams ............................ 99/2
3,615,653 A * 10/1971 Fults et al. ...................... 99/8

FOREIGN PATENT DOCUMENTS

| DE | 2462502 | 4/1974 |
| EP | 0 028 535 | 5/1980 |
| EP | 0 043 202 | 6/1981 |
| EP | 0 335 242 | 3/1989 |
| GB | 1494295 | 1/1976 |
| NO | 151067 | 5/1980 |
| SE | 414992 | 4/1974 |

* cited by examiner

*Primary Examiner*—Chhaya D. Sayala
(74) *Attorney, Agent, or Firm*—Timothy J. Keefer; Wildman, Harrold, Allen & Dixon

(57) ABSTRACT

The present invention comprises an additive for compound feed for pigs, sheep, goats, poultry, cattle, horses, dogs, cats and fur-bearing animals, which contains an organic or inorganic acid, or salts thereof, espacially formic acid, with a beneficial effect on the treatment of compound feed, and a spent sulphite liquor from an acidic or neutral cellulose sulphite cook. The additive contains the acid or salts thereof in an amount ranging from 10–90 percentage weight, and the spent sulphite liquor in an amount ranging from 10–90 percentage weight. The additive is added is added to the compound feed in an amount ranging from 0,2 to 3,0 %. The spent sulphite liquor can be adsorbed on a suitable carrier, such as soy meal or water-adsorbing silicates, in order to attain a dry composition.

18 Claims, No Drawings

GROWTH ENHANCERS

The present invention relates to a growth enhancing additive to compound feed, containing an organic or inorganic acid, or salts thereof, with a beneficial effect on the treatment of compound feed, and a spent sulphite liquor from an acidic or neutral cellulose sulphite cooking.

It is known that the addition of acid to compound feed for pigs has an efficacious effect on their growth and health. Further, the acid addition to compound feed reduces the amount of consumed compound feed per kg of growth without the increased growth affecting the quality of the meat, since the percentage of meat remains relatively unchanged. This also saves on feed costs by reducing the feeding period and promoting better housing utilization.

The quality of the feed is also improved, as the acid kills undesirable bacteria and microorganisms in the feed.

The efficacious effects on pigs of adding acid to the compound feed with which they are fed is due to the beneficial effect that it has on the digestive system. The addition of acid inhibits the activity of and kills unfavorable and undesirable bacteria in the digestive tract of the pig. This results in a generally healthier environment in the stomach and intestinal tract of the pig. The natural bacterial intestinal flora achieve balance; the result is fewer digestive disorders, less diarrhea, and more compact manure. A low pH in the stomach also promotes an increase in the secretion of important digestive enzymes such as pepsin. This enzyme is important in the digestion of proteins. Increased pepsin secretion results in better digestion and protein utilization and thus to enhanced growth. At present there are compound feed products on the market, including Felleskjøpet's "Format", that exploit this principle.

It is also known that for other types of products, such as silage agents, it has been suggested that acids be used, along with spent sulphite liquor (SSL) as silage additive for grass, grain, masque etc., especially for preserving the protein content of the feed (Norwegian Patent No. 803321). Likewise, in European Patent Application A0043202, it has been suggested that an aqueous composition of sulphite spent sulphite liquor or lignosulphonate, organic acids and formaldehyde be used to treat animal feed containing protein or carbohydrate, in order to prolong the preservation of the feed.

Organic acids such as formic acid, acetic acid, etc. are customarily used as acid additives to compound feed.

There are a number of problems, however, with using strong acids such as formic acid, including the corrosion of equipment and exposure for those handling the product. There is considerable corrosion on storage tanks, mixing equipment, the production line for pelleted feed in particular. This drives up the operating costs and leads to the added burden of increased maintenance and system monitoring. Formic acid is corrosive to the skin and can cause damage from burning, which is why it is necessary to work with full body protection. During pelletising the temperature rises to 80–95° C., which leads to the evaporation of some of the formic acid, the vapors of which are very dangerous on inhalation.

Another, purely practical problem arises in the many cases in which feed mills and breeders lack the equipment for dosing liquids.

In the present invention the above-mentioned problems associated with the use of acid additives in compound feed by adding a spent sulphite liquor from acidic or neutral cellulose sulphite cooking have been reduced. The spent sulphite liquor from acidic or neutral cellulose sulphite cooking is highly effective in reducing corrosion. It has also been shown that the amount of acid used can be reduced compared to the amounts used previously. A reduction in the amount of acid and the addition of the aforementioned spent sulphite liquor is expected to resolve the problem with evaporation of the acid in the manufacture of compound feed. If, in addition, the spent sulphite liquor is adsorbed on a carrier, further improvement is obtained. By adsorption of the spent sulphite liquor on a carrier, a dry product is attained which, in turn, can overcome the problem of feed mills and breeders not having the systems for liquid dosing.

Surprisingly, however, it has also been shown that the additive has a positive effect, beyond that of pure formic acid, on the growth of pigs. Studies show that a synergistic effect is obtained by using both formic acid and lignosulphonate, despite the fact that the concentration of formic acid is reduced.

The present invention includes a growth enhancing additive to compound feed that contains an organic or inorganic acid, or salts thereof, with a beneficial effect on the treatment of compound feed, and spent sulphite liquor from an acidic or neutral cellulose sulphite cooking. The spent sulphite liquor has a pH value in the range of 1 to 10. The base used to produce the spent sulphite liquor is either calcium, sodium, ammonia or magnesium.

The organic or inorganic acids with a beneficial effect on the treatment of compound feed are formic acid, acetic acid, propionic acid, citric acid, hydrochloric acid, phosphoric acid or mixtures thereof, formic acid being particularly preferred.

The salts of these acids are ammonium salts, alkaline and/or alkaline earth metal salts, especially $NH_4-$, $Na-$, $Ca-$ or $Mg-$.

By spent sulphite liquor from an acidic or neutral cellulose sulphite cooking is meant the spent sulphite liquor produced by treating timber with an aqueous liquid to which has been added sulphur dioxide and the aforementioned cations ammonia, sodium, calcium or magnesium. The main ingredient in the resulting spent sulphite liquor, after the separating out of cellulose, is lignosulphonate. In addition, there are mono and polymer sugars and inorganic salts.

The acidic or neutral cellulose sulphite spent sulphite liquor can also be adsorbed on a suitable carrier in order to obtain a dry substance. By carrier is meant a dry particulate. Such a material, for example, might be one of the ingredients in compound feed, e.g. soy meal or a water adsorbing silicate.

The additive contains an organic or inorganic acid, or salts thereof, with a beneficial effect on the treatment of compound feed, in an amount ranging from 10–90 percentage weight, and a spent sulphite liquor from an acidic or neutral cellulose sulphite cooking in an amount ranging from 10–90 percentage weight.

The additive is added to the compound feed in amounts ranging from 0,2 to 3,0%, preferably from 0,4 to 1,5%, and more preferably from 0,6 to 1,0%.

The following examples are meant to illustrate the invention without limiting its scope in any way.

EXAMPLES

Example 1

Feeding experiments were carried out on pigs using the following 3 mixtures of feed:

a) Standard compound feed containing the following main ingredients:

| | |
|---|---|
| Barley | 65% |
| Oats | 18% |
| Bone meal | 7% |
| Soy meal | 4% |
| Destruction fat | 4% |
| Herring meal | 1% | b) Standard compound feed to which has been added 0,6% formic acid, and c) Standard compound feed to which has been added 0,4% formic acid and 0,2% of a lignosulphonate product derived from sulphite spent sulphite liquor (reckoned as a dry substance).

There were 24 animals in each group, each having an initial weight of 33 kg and a final weight of approx. 105 kg.

The following results were obtained:

| | Compound feed mixture | | |
|---|---|---|---|
| | A | b | c |
| Growth per day (g) | 841 | 888 | 901 |
| Percentage of meat | 53.8 | 53.5 | 54.3 |
| Feed consumption (FUp*/kg growth) | 2.85 | 2.75 | 2.73 |

*Feed units pigs

It is observed that the growth per day is markedly better with the addition of formic acid than with compound feed alone. However, experiment (c) shows a further increase in growth, despite the reduction in the amount of formic acid. This indicates that the lignosulphonate product has a further positively enhancing effect on the growth. The feed consumption is reduced by using formic acid, and this effect is also being observed on addition of the lignosulphonate product. This improves the profitability of using formic acid, and so it does with the lignosulphonate product addition. The percentage of meat is virtually unchanged.

Example 2

Instead of adding the mixture of formic acid and lignosulphonate product to the feed in liquid form, it could occasionally be highly appropriate to add it in powdered form. Experiments have been carried out to adsorb a mixture of formic acid and liquid lignosulphonate on soy meal and also on a water-absorbing silicate. The mixture contained 60% formic acid and 40% concentrated solution of lignosulphonate calculated as a dry substance. The results show that it is possible to add more than 20% of the mixture to soy meal and more than 30% to the silicate with no apparent troublesome lumping of the product. This shows that it is possible to dose the mixture to the feed in powdered form where this is desirable or necessary.

Example 3

Standard corrosion tests on a cold-rolled steel plate were carried out over a 16-day period, which showed the following:

| | Corrosion rate (mm/year) |
|---|---|
| Formic acid 85% | 0,88 |
| 60/40 formic acid/concentrated lignosulphonate solution | 0,39 |
| 50/50 formic acid/concentrated lignosulphonate solution | 0,25 |
| 40/60 formic acid/concentrated lignosulphonate solution | 0,18 |
| Tap water | 0,08 |

The results show that the use of formic and lignosulphonate product corrode far less than pure formic acid.

What is claimed is:

1. A feed compound additive comprising an acid and a spent sulphite liquor from a cellulose sulphite cooking, where the spent sulphite liquor has a pH in the range of 1 to 10, and the additive contains the acid in an amount ranging from 10 to 90% by weight and the spent sulphite liquor in an amount ranging from 10 to 90% by weight, wherein the acid and the liquor are capable of being adsorbed on a suitable carrier in order to obtain a dry substance.

2. The additive of claim 1 wherein the acid is an organic acid selected from the group consisting of formic acid, acetic acid, propionic acid, citric acid, and mixtures or salts thereof.

3. The additive of claim 1 wherein the acid is an inorganic acid selected from the group consisting of hydrochloric acid, phosphoric acid, and mixtures or salts thereof.

4. The additive of claim 2 or 3 wherein the salt is selected from a group consisting of ammonium, alkaline, and alkaline earth metal.

5. The additive of claim 1 wherein:
   the spent sulphite liquor results from an acidic cellulose sulphite cooking; and
   the spent sulphite liquor is produced with a base selected from the group consisting of calcium, sodium, ammonia and magnesium.

6. The additive of claim 1 wherein:
   the spent sulphite liquor results from a neutral cellulose sulphite cooking; and
   the spent sulphite liquor is produced with a base selected from the group consisting of calcium, sodium, ammonia and magnesium.

7. The additive of claim 1 wherein the acid and the liquor are absorbed on a particulate carrier.

8. The additive of claim 7 wherein the particulate carrier is selected from the group consisting of soy meal and water-absorbing silicates.

9. An improved feed compound wherein the improvement comprises:
   an additive having an acid and a spent sulphite liquor from a cellulose sulphite cooking, where the spent sulphite liquor has a pH in the range of 1 to 10, and the additive contains the acid in an amount ranging from 10 to 90% by weight and the spent sulphite liquor in an amount ranging from 10 to 90% by weight, wherein the acid and the liquor are capable of being adsorbed on a suitable carrier in order to obtain a dry substance; and
   the additive is about approximately 0.2 to 3.0% by weight of the compound.

10. The additive of claim 9 wherein the acid is an organic acid selected from the group consisting of formic acid, acetic acid, propionic acid, citric acid, and mixtures or salts thereof.

11. The additive of claim 9 wherein the acid is an inorganic acid selected from the group consisting of hydrochloric acid, phosphoric acid, and mixtures or salts thereof.

12. The additive of claim 10 or 11 wherein the salt is selected from a group consisting of ammonium, alkaline, and alkaline earth metal.

13. The additive of claim 9 wherein:

the spent sulphite liquor results from an acidic cellulose sulphite cooking; and the spent sulphite liquor is produced with a base selected from the group consisting of calcium, sodium, ammonia and magnesium.

14. The additive of claim 9 wherein:

the spent sulphite liquor results from a neutral cellulose sulphite cooking; and the spent sulphite liquor is produced with a base selected from the group consisting of calcium, sodium, ammonia and magnesium.

15. The feed compound of claim 9 wherein the additive is about approximately 0.4 to 1.5% by weight of the compound.

16. The feed compound of claim 9 wherein the additive is about approximately 0.6 to 1.0% by weight of the compound.

17. The additive of claim 9 wherein the acid and the liquor are absorbed on a particulate carrier.

18. The additive of claim 17 wherein the particulate carrier is selected from the group consisting of soy meal and water-absorbing silicates.

* * * * *